(12) United States Patent
Jarpenvaa

(10) Patent No.: US 8,125,378 B1
(45) Date of Patent: Feb. 28, 2012

(54) SYSTEM AND METHOD FOR DETERMINING POSITION USING DOPPLER VELOCITIES

(75) Inventor: Janne Jarpenvaa, Tampere (FI)

(73) Assignee: Qualcomm Atheros, Inc., San Jose, CA (US)

( * ) Notice: Subject to any disclaimer, the term of this patent is extended or adjusted under 35 U.S.C. 154(b) by 199 days.

(21) Appl. No.: 12/476,383

(22) Filed: Jun. 2, 2009

Related U.S. Application Data

(60) Provisional application No. 61/057,956, filed on Jun. 2, 2008.

(51) Int. Cl.
*G01S 19/09* (2010.01)
*G01S 5/10* (2010.01)

(52) U.S. Cl. ............... 342/357.46; 342/357.78

(58) Field of Classification Search ............. 342/357.21, 342/357.23, 357.46, 357.78; 701/207, 213
See application file for complete search history.

(56) References Cited

U.S. PATENT DOCUMENTS

| | | | | |
|---|---|---|---|---|
| 3,702,477 A | * | 11/1972 | Brown | 342/451 |
| 6,061,021 A | * | 5/2000 | Zibell | 342/418 |
| 6,215,442 B1 | | 4/2001 | Sheynblat et al. | |

* cited by examiner

*Primary Examiner* — Dao Phan
(74) *Attorney, Agent, or Firm* — Bay Area Technology Law Group PC

(57) ABSTRACT

This disclosure is directed to systems and methods for providing GPS positioning determinations from a single set of Doppler measurements from a plurality of satellites in conjunction with satellite ephemeris data and a rough GPS time estimate. Measured Doppler velocities are compared with Doppler velocities calculated from ephemeris data and used to estimate the receiver position.

18 Claims, 3 Drawing Sheets

SYSTEM AND METHOD FOR DETERMINING POSITION USING DOPPLER VELOCITIES

CROSS-REFERENCE TO RELATED APPLICATIONS

This application claims the benefit of U.S. Provisional Patent Application Ser. No. 61/057,956, filed Jun. 2, 2008, which is hereby incorporated by reference in its entirety.

FIELD OF THE PRESENT INVENTION

This disclosure relates generally to satellite navigation receivers and, in particular, to systems and methods for generating position information using measured and calculated Doppler velocities from a plurality of satellites.

BACKGROUND OF THE INVENTION

Satellite navigation systems allow electronic receivers to determine navigational information such as position (latitude, longitude, and altitude), velocity and time, also known as PVT information. One example of such a system is the United States Naystar Global Positioning System (GPS), which may include up to thirty-two or more functional navigation satellites. Other examples of satellite navigation systems include the Russian GLONASS system and the European Galileo system. Satellite navigation receivers, such as GPS receivers typically use GPS data from three or more orbiting satellites to determine navigation information. Only a portion of the satellites within a navigation system may be visible to a particular navigation receiver at a given time.

GPS satellites typically transmit GPS signals on two bands: the L1 band with a carrier frequency of 1575.42 MHz and the L2 band with a carrier frequency of 1227.60 MHz. Traditionally, only authorized users have been able to use data transmitted on the L2 band. In the future, civilian GPS signals may be transmitted on the L2 band and the L5 band (1176.45 MHz). Typically, low cost GPS receivers receive only on one of these bands. Some civilian GPS receivers may use clock data from the L2 band to refine GPS data carried in the L1 band. The following descriptions use the L1 band to describe exemplary embodiments; however, other embodiments may be implemented using one or more GPS bands or other global positioning signals.

GPS satellites transmit data using a form of spread spectrum coding known as code division multiple access (CDMA). Each satellite may be assigned a coarse acquisition (C/A) code that resembles pseudo random noise (PRN) and is typically unique to that satellite and can be used to identify it. Each satellite encodes data using the satellite's C/A code and transmits encoded data on the L1 carrier frequency (i.e., data is spread using the C/A code). Thus, all satellites are simultaneously transmitting data on a shared carrier frequency. In some embodiments, a ground-based pseudo-GPS satellite (i.e., a pseudo-lite) may transmit GPS data by using a C/A code not used by any satellites or of a satellite that may be out of view of the GPS receiver. Once a GPS signal with a particular C/A code is received and identified, the GPS receiver is said to have "acquired" the GPS satellite associated with that C/A code. A GPS receiver may also "track" a GPS satellite by continuing to receive a GPS signal from a previously acquired GPS satellite.

The conventional approach to using GPS satellites for user positioning requires the receiver to download the navigation message from a plurality of visible satellites using a time-of-arrival strategy. Position information is derived by calculating the distance of the receiver from each satellite based upon the time it takes the navigation message to propagate from the satellite to the receiver, multiplied by the speed of light. The navigation message includes the time the message was sent, allowing the receiver to calculate the propagation time by comparison to the arrival time. However, since the receiver is not perfectly synchronized with the satellite clocks, the calculated range to the satellite contains an error due to this clock difference and is termed a "pseudorange." By determining an appropriate clock correction variable, the true range can be determined. Accordingly, a complete PVT solution requires determination of the three positional coordinates as well as clock correction variable. As will be appreciated, the presence of four variables usually requires four independent signals to provide a system of four equations against which these variables can be solved. Thus, conventional GPS positioning requires the reception of navigation messages from four separate satellites.

Under conventional schemes, the receiver has to wait until at least four satellites have been acquired and their navigation messages downloaded before estimating the user position. This time period is generally known as the time to first fix (TIFF). Since the time required to receive the navigational broadcasts nom each satellite ranges from 18 to 36 seconds, there can be a delay of approximately 30 seconds and up to several minutes before navigational determinations can be made, even if at least four satellites are visible. If fewer satellites are available, then TIFF can be delayed indefinitely.

The GPS receiver determines propagation time by comparing the received CIA code against the known code for each satellite in order to determine the time offset that corresponds to the signal propagation time. However, the satellite retransmits the C/A code each millisecond, the initial offset determination can only resolve the sub-millisecond portion of the propagation time. However, the travel time for a GPS signal from a satellite to a receiver on Earth is between approximately 60 to 80 ms. Accordingly, initial C/A time measurements are subject to an integer-ms ambiguity, wherein the number of full ms in a signal traveling time is not known. Conventionally, GPS receivers usually continue tracking the signal long enough to resolve this ambiguity after a sufficiently long piece (approximately 6 seconds, typically) of the GPS navigation message has been decoded. Unfortunately, constantly tracking an acquired satellite requires substantial power and computational resources and represents a significant energy drain in personal GPS devices.

Other prior art solutions to the integer-ms ambiguity problem involve calculations that can be made when a rough estimate of the receiver position is available and when the receiver's on-board clock is not too far out of synchronization with the nominal GPS system time. Specifically, the integer portion of the propagation time can be conventionally determined when the receiver location is known to within approximately 150 km and the time estimate is within approximately one second. When the GPS time estimate is less accurate and when there is no knowledge of the current position, however, solving the integer-ms ambiguity and position simultaneously can be very time consuming using conventional GPS techniques.

As one of skill in the art will appreciate, it would be desirable to provide a positioning estimate, even at the expense of some accuracy, from an initial set of received satellite transmissions without the need for continuous tracking. For example, any number of devices, such as digital cameras, could benefit from having some capacity for location awareness without the need for constant position determination. Indeed, many such portable devices would benefit from a GPS technique that offered the ability to estimate position with reduced power consumption and computational requirements.

Furthermore, it would be desirable to precisely determine signal propagation times without downloading an entire navigation message from each satellite. As will be appreciated, resolving the integer-ms ambiguity from an initial set of satellite receptions can significantly reduce TTFF and makes computational resources available for other GPS tasks.

SUMMARY OF THE INVENTION

In accordance with the above needs and those that will be mentioned and will become apparent below, this disclosure is directed to a method for determining a position of a GPS receiver comprising the steps of receiving navigation messages from a plurality of satellites, measuring Doppler velocities for the plurality of satellites at a given time from the received navigation messages, calculating Doppler velocities for an estimated position of the receiver corresponding to the plurality of satellites from ephemeris data at the given time, comparing calculated Doppler velocities with measured Doppler velocities for the plurality of satellites, and finding a corrected estimated position of the receiver using the compared Doppler velocities.

Preferably, the step of comparing calculated Doppler velocities with measured Doppler velocities comprises determining a difference vector between the measured Doppler velocity and the calculated Doppler velocity for each of the plurality of satellites. The method also preferably includes selecting the component in the difference vector with the largest absolute value, which corresponds to a first satellite of the plurality of satellites. In the noted embodiment, the step of finding a corrected estimated position of the receiver using the compared Doppler velocities comprises selecting a location by moving along a satellite velocity vector of the first satellite and projecting that location onto the Earth in order to generate the corrected estimated position. Preferably, the location is selected by moving backward on the satellite velocity vector of the first satellite when the calculated Doppler velocity is larger than the measured Doppler velocity and by moving forward on the satellite velocity vector of the first satellite when the calculated Doppler velocity is smaller than the measured Doppler velocity.

In another aspect, the method further comprises the step of iterating the position estimate by using the corrected estimated position to calculate new Doppler velocities for the plurality of satellites and comparing the calculated new Doppler velocities to the measured Doppler velocities. Preferably, the iterations are halted when a difference vector between a calculated new Doppler velocity and a measured Doppler velocity falls below a desired threshold. In one embodiment, the desired threshold comprises 5 m/s.

In an alternative embodiment, the step of finding a corrected estimated position comprises performing a mean square routine that estimates position by minimizing differences between the calculated Doppler velocities and the measured Doppler velocities.

In another aspect, the step of comparing calculated Doppler velocities with measured Doppler velocities further comprises removing a common error, $err_{COMM}$, from the measured Doppler velocities.

Preferably, the methods disclosed herein provide a corrected estimated position of the receiver having an accuracy of better than approximately 60 km.

This disclosure is also directed to a GPS receiver configured to receive navigation messages from a plurality of satellites, calculate Doppler velocities for an estimated position of the receiver corresponding to the plurality of satellites from ephemeris data at a time corresponding to the reception of the navigation messages, measure Doppler velocities for the plurality of satellites from the received navigation messages, compare calculated Doppler velocities with measured Doppler velocities for the plurality of satellites, and find a corrected estimated position of the receiver using the compared Doppler velocities.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

This disclosure is directed to systems and methods for providing a GPS positioning determination from a single set of Doppler measurements from a plurality of satellites in conjunction with satellite ephemeris data and a rough GPS time estimate. The time estimates for the disclosed approaches require accuracy of within approximately three seconds.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

As used herein, the terms "navigation device," "GPS receiver," "device" and "receiver" are used interchangeably to refer to an apparatus capable of receiving data from navigation satellites and determining position, velocity and/or time information form that data.

As used herein, the term "navigation message" refers to the data stream broadcast by a navigation satellite and includes the broadcast ephemeris, the ionospheric models, and clock correction coefficients.

As used herein, the term "ephemeris data" refers to characteristics of a given satellite's orbit, including position and velocity. Typically, ephemeris data is obtained by receiving a broadcast navigation message. However, ephemeris data also can be obtained by calculation from information stored in the receiver, delivery from another source, such as by Assisted GPS, or by any other suitable means.

As used herein, the term "pseudorange rate" is a measure of the Doppler shift in the frequency of the navigation message transmitted by the satellite, due to the relative motion of the satellite with respect to the receiver. Doppler shift is measured in Hertz and pseudorange rate is scaled to m/s by the wavelength of the signal.

As used herein, the term "Doppler velocity" is the velocity component of a given satellite along the line of sight of the receiver relative to that satellite. The Doppler velocity is computed as a function of the frequency offset from the nominal frequency of the carrier wave.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

Figure 1:
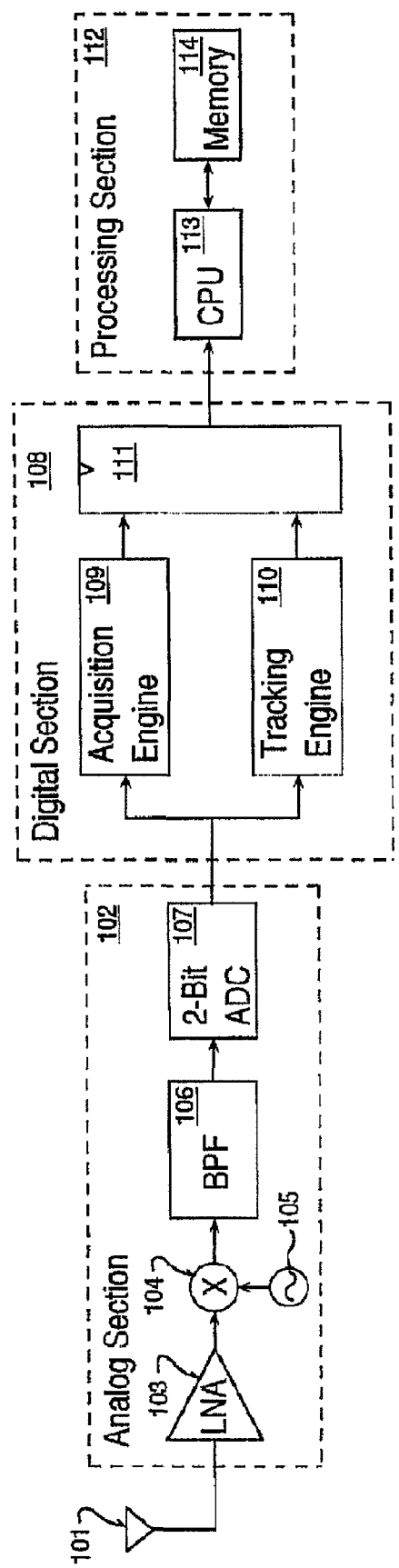
FIG. 1 is a conceptual diagram of a GPS receiver, suitable for practicing an embodiment of the invention.

FIG. 1 is a schematic representation of the general sections of a conventional GPS receiver 100, suitable for implementing the techniques detailed in this disclosure. An antenna 101 receives the RF signals from the GPS satellites. The RF signals are then amplified, down converted, filtered, and converted into a digital signal by the analog section 102. Specifically, a low-noise amplifier 103 amplifies the weak RF signals. A mixer 104 and local oscillator 105 down converts the amplified RF signals to a lower intermediate frequency (IF) signal. A band pass filter 106 is used to filter out interference. The filtered IF signal is then converted into an equivalent digital IF signal by means of a 1 or 2-bit analog-to-digital converter (ADC) 107. The digital IF signal is then input to a digital section 108. The acquisition engine 109 and tracking engine 110 of the digital section 108 process the digital IF signal to extract the navigation message which is then input to the processing section 112 by means of register 111. The central processing unit (CPU) 113 analyzes the navigation message according to programming instructions stored in the memory 114 and produces the final location information.

As discussed above, this disclosure is directed to systems and methods for providing a GPS positioning determination from a single set of Doppler measurements from a plurality of satellites in conjunction with satellite ephemeris data and a GPS time estimate. The time estimates for the disclosed approaches only require accuracy of within approximately three seconds as compared to prior art schemes described above that require accuracy within one second.

When ephemerides for visible satellites are available, it is a straightforward process to calculate the Doppler velocity of a satellite for any position on Earth. Relative motion, primarily due to the satellite's orbit, between the satellite and the receiver causes a raising or lowering in the frequency of the wavelength of a signal transmitted by the satellite, depending upon whether the satellite is approaching or receding from the receiver. This phenomenon is known as the Doppler effect. Given that the propagation speed of the signal is typically much larger than the relative velocity between the satellite and the receiver, the Doppler shift in frequency can be modeled.

$$\omega_r = \frac{\omega \left( v^{(i)} \cdot \frac{s^{(i)} - u}{\|s^{(i)} - u\|} \right)}{c} \quad (1)$$

where ω is the frequency of the satellite transmission, $\omega_r$ is the frequency of the transmission at the receiver, $v^{(i)}$ is the relative velocity between the receiver and the satellite i, u and $s^{(i)}$ are the 3-dimensional position vectors of the receiver and position of satellite number i, respectively and c is the speed of light.

Preferably, equation (1) is applied when the receiver static, so that $v^{(i)}$ is equal to the velocity of satellite i in the Earth-centered Earth-fixed (ECEF) frame and is computed using the satellite ephemeris. In other embodiments, where the precise movement of the receiver is known, the equation can be modified to account for receiver motion. For applications with uncompensated receiver motion, the accuracy of the estimation will be reduced.

Correspondingly, the Doppler velocity of a given satellite i is the velocity component of satellite i along the line of sight to the receiver, the unit vector given $$\text{by } \frac{s^{(i)} - u}{\|s^{(i)} - u\|}.$$

As can be seen, the Doppler velocity is computed as a function of the frequency offset from the nominal frequency of the carrier wave. Using the satellite ephemerides, the Doppler velocity can be calculated for each satellite at any given position on Earth for a specific time. Those calculated Doppler velocities can be regarded as a "fingerprint" which then can be compared with the fingerprint of the measured Doppler velocities.

Figure 2:
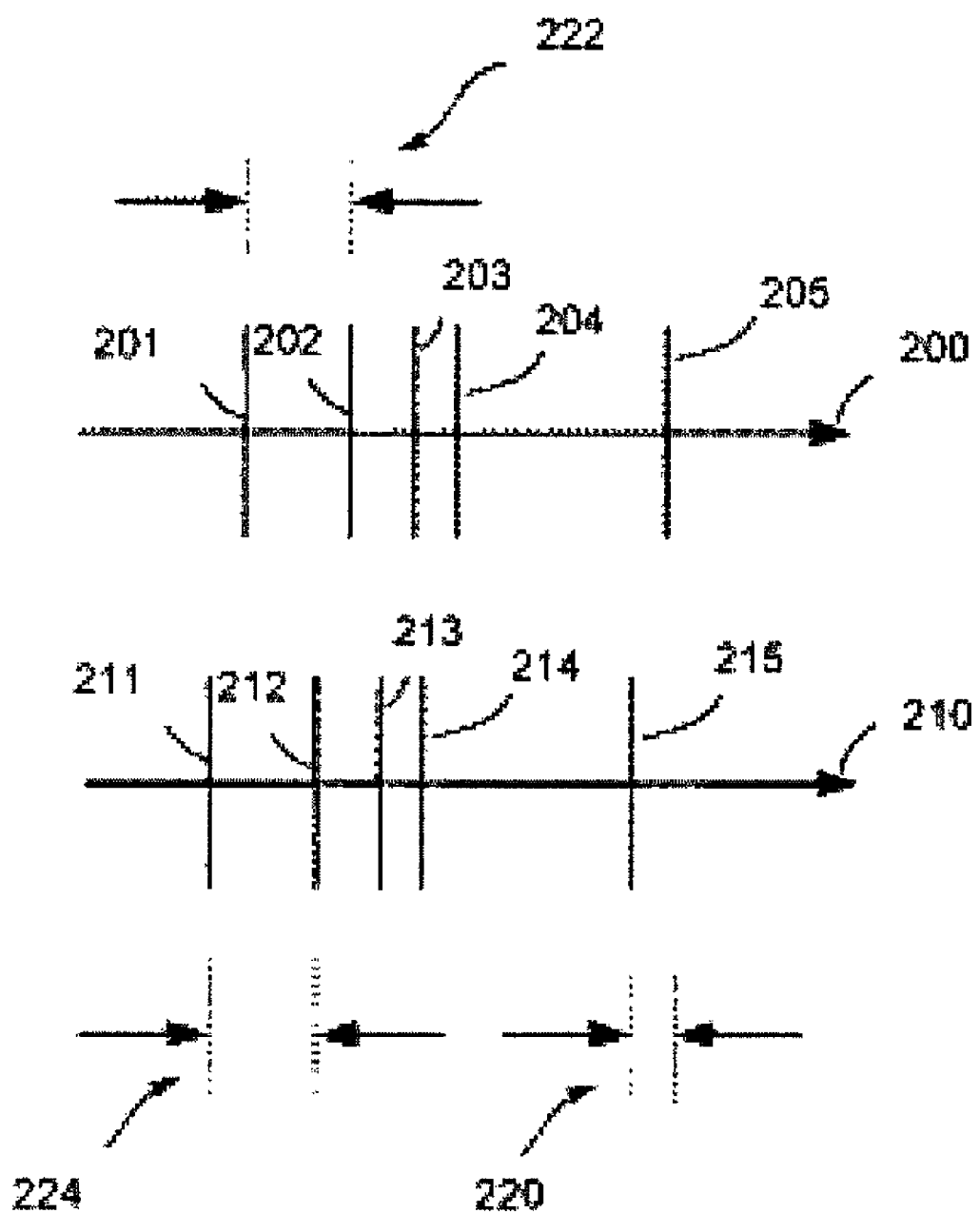
FIG. 2 is a graphical representation comparing measured Doppler velocities to calculated Doppler velocities, according to the invention.

FIG. 2 graphically depicts an example of Doppler velocities being used as a fingerprint to determine the position of a receiver. As shown, plot 200 shows the measured Doppler velocities for satellites 201-205. Similarly, plot 210 shows the calculated Doppler velocities for satellites 211-215, derived from ephemeris data, for an estimated position at a time corresponding to the Doppler measurements.

In practice, the receiver clock frequency is non-ideal and will vary slightly from the nominal GPS system clock frequency, typically resulting in an error of less than approximately 5 ppm. Accordingly, even if the position of the receiver used to calculate the Doppler velocities is accurate, the clock error and other errors will lead to a difference between each pair of measured and calculated Doppler velocities. Since a large portion of these errors is common to all the measured Doppler velocities, it is relatively constant and is reflected as an offset between each pair of measured and calculated Doppler velocities, as shown by $\text{err}_{COMM}$ 220 between satellite 205 and satellite 215.

Therefore, after accounting for $\text{err}_{COMM}$, it can be seen that the difference between measured Doppler velocities $\text{diff}_M$ 222, as shown between satellites 201 and 202 corresponds to the difference between calculated Doppler velocities $\text{diff}_C$ 224, as shown between satellites 211 and 212. Thus, receiver position can be estimated such that the measured Doppler velocities match as closely as possible the calculated Doppler velocities for that position.

Figure 3:
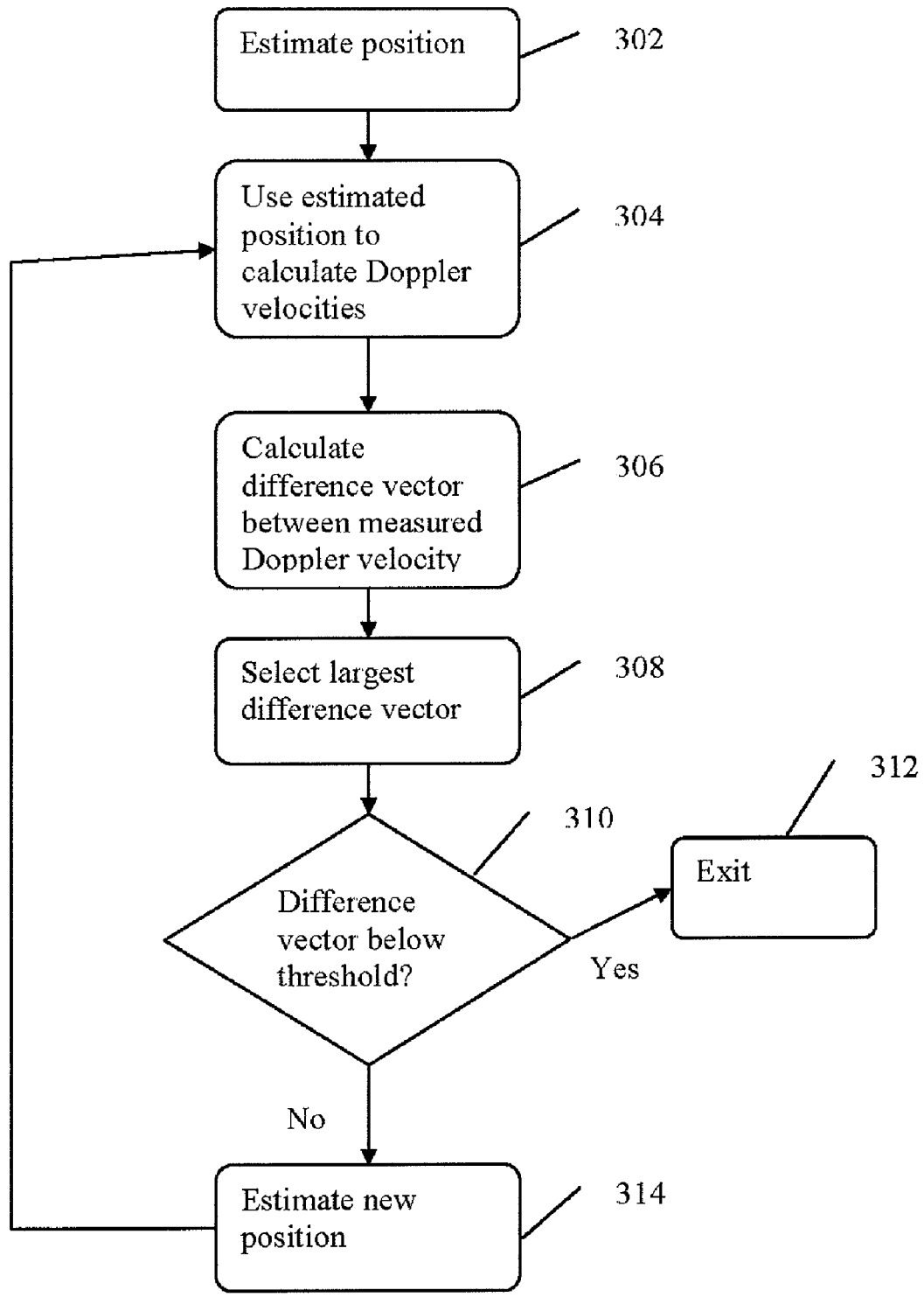
FIG. 3 is a flowchart showing the steps for estimating position by comparing measured Doppler velocities to calculated Doppler velocities, according to the invention.

In one embodiment of the invention, a suitable algorithm for estimating position by matching measured Doppler velocities to calculated Doppler velocities by iteration is depicted in FIG. 3. In step 302, a suitable starting position is estimated. In one embodiment, each visible satellite is projected onto the Earth and an average of those positions is determined. The satellite position is projected on the Earth by calculating the point at which a line connecting the center of the Earth and the satellite inter sects the modeled surface of the Earth. In another embodiment, the starting estimated position places the satellite corresponding to the median of measured Doppler velocities at zenith. Preferably, in these embodiments a spherical model is used for the Earth, as this represents sufficient accuracy given the estimates being used and is computationally less intensive.

After the starting position is estimated, Doppler velocities for one or more visible satellites are calculated for the time the Doppler measurements were made at the estimated position in step 304. In step 306, a difference vector is calculated between the measured Doppler velocity and the calculated Doppler velocity for each satellite after accounting for $err_{COMM}$. The initial correlation between each measured Doppler velocity and the calculated Doppler velocity is made using the satellite's PRN number. The largest component in the difference vector is selected in step 308. Next, in step 310, the magnitude of the largest component in the difference vector is examined. If the magnitude is below a given threshold, it can be assumed that the estimated position is sufficiently accurate, and the routine is terminated in step 312.

Otherwise, a refined position is estimated in step 314 and the routine returns to step 304 for another iteration. These steps are repeated until the value determined in step 310 meets a desired requirement. In a preferred embodiment, a suitable threshold value is approximately 5 m/s. In other embodiments, larger threshold values can be employed if the oscillator or time uncertainties are larger or if the application demands less accuracy.

Preferably, the refined estimated position is estimated derived from the velocity vector of the satellite exhibiting the largest component in the difference vector. If the calculated Doppler velocity for this satellite is larger than the measured Doppler velocity, the new estimated position is determined by selecting a location by moving the satellite backward along its velocity vector and projecting from that location onto the Earth. Correspondingly, if the calculated Doppler velocity for this satellite is smaller than the measured Doppler velocity, the new estimated position is determined by selecting a location by moving forward along the satellite velocity vector and projecting that location onto the Earth. In these operations, it is preferable to use an ellipsoidal model of the Earth to provide more accurate results.

Generally, at least three satellites are used to perform the estimation procedures described herein. As will be recognized, these techniques do not solve for time, but use the coarse time estimate derived from the GPS receiver's on-board clock, for example. Thus, only three unknowns, corresponding to the coordinates of the receiver in three dimensional space, need to be solved. Three independent equations, formed from three satellites, then, are required for to solve for these three unknowns. In practice, it is preferable to use a greater number of Doppler measurements, and thus satellites, to reduce the effects of measurement noise and clock error. Alternatively, fewer satellites can be used if other sources of data are able to partially solve the equations, for example by using an altimeter to estimate elevation.

In an alternate embodiment, a least squares routine is substituted for the iteration process described above. As will be appreciated, an estimate for the position can be selected such that it results in the smallest error between measured and calculated Doppler velocities after accounting for $err_{COMM}$. Using this least squares method, the measure of error is the sum of squared differences between the measured and calculated Doppler velocities.

Using the above techniques, a position estimate within 20 km of the true position typically can be made. Further, in one specific test case with 4 satellites and a three second time error, the estimate was still within 60 km of the true position. As will be appreciated by one of skill in the art, the integer-ms ambiguity in signal traveling times can be resolved given this degree of position estimate accuracy. In turn, the disclosed techniques can be seen to significantly aid the calculation of the final position and time estimates. For example, the resolution of the integer-ms ambiguity without the necessity of performing pseudorange measurements represents a reduction in computational complexity, allowing subsequent conventional position determinations to be made more easily and/or more rapidly.

As discussed above, it is necessary to use satellite ephemeris data to calculate the Doppler velocities for visible satellites. The ephemeris data can be downloaded from the satellite navigation messages as in conventional GPS determinations. Alternatively, ephemeris data can be delivered by any suitable means, including wireless or wired network connections, through removable media and the like. The use of ephemeris data from sources other than satellite navigation messages generally falls within the field of Assisted GPS (A-GPS) and suitable techniques are well known to those of skill in the art. Similarly, initial rough time estimates can be taken from an on-board clock or can be obtained over a wireless network or by other suitable means.

One having skill in the art will recognize that satellite positions and velocities can also be predicted using means other than broadcast ephemeris or ephemeris delivered wirelessly. For example, such predictions can be presented by using the same parameters as in broadcast ephemeris. Any other means of predicting satellite position and velocity may also be used to calculate the Doppler velocities.

Described herein are presently preferred embodiments, however, one skilled in the art that pertains to the present invention will understand that the principles of this disclosure can be extended easily with appropriate modifications to other applications. For example, the techniques of this specification can be adapted for other global navigation satellite systems including Galileo, GLONASS and Compass. As such, changes and modifications are properly, equitably, and intended to be, within the full range of equivalence of the following claims.

What is claimed is:

1. A method for determining a position of a GPS receiver capable of receiving navigation messages from a plurality of satellites comprising the steps of:
   receiving navigation messages from a plurality of satellites;
   measuring Doppler velocities for the plurality of satellites from the received navigation messages at a given time;
   calculating Doppler velocities for an estimated position of the receiver corresponding to the plurality of satellites from ephemeris data at the given time;
   comparing calculated Doppler velocities with measured Doppler velocities for the plurality of satellites;
   finding a corrected estimated position of the receiver using the compared Doppler velocities; and
   iterating the position estimate by using the corrected estimated position to calculate new Doppler velocities for the plurality of satellites and comparing the calculated new Doppler velocities to the measured Doppler velocities.

2. The method of claim 1, wherein the step of comparing calculated Doppler velocities with measured Doppler velocities comprises determining a difference vector between the measured Doppler velocity and the calculated Doppler velocity for each of the plurality of satellites.

3. The method of claim 2, wherein the step of comparing calculated Doppler velocities with measured Doppler velocities further comprises selecting the component in the difference vector with the largest absolute value, which corresponds to a first satellite of the plurality of satellites.

4. The method of claim 3, wherein the step of finding a corrected estimated position of the receiver using the compared Doppler velocities comprises selecting a location by moving along a satellite velocity vector of the first satellite and projecting that location onto the Earth to generate the corrected estimated position.

5. The method of claim 4, further comprising the step of halting the iterations when a difference vector between a calculated new Doppler velocity and a measured Doppler velocity falls below a desired threshold.

6. The method of claim 5, wherein the desired threshold comprises 5 m/s.

7. The method of claim 2, wherein the step of comparing calculated Doppler velocities with measured Doppler velocities further comprises removing a common error, $err_{COMM}$, from the measured Doppler velocities.

8. The method of claim 1, wherein the step of finding a corrected estimated position comprises performing a least squares routine that estimates position by minimizing differences between the calculated Doppler velocities and the measured Doppler velocities.

9. The method of claim 1, wherein the step of finding a corrected estimated position of the receiver using the compared Doppler velocities has an accuracy of better than approximately 60 km.

10. A GPS receiver configured to:
receive navigation messages from a plurality of satellites;
measure Doppler velocities for the plurality of satellites at a given time from the received navigation messages;
calculate Doppler velocities for an estimated position of the receiver corresponding to the plurality of satellites from ephemeris data at the given time;
compare calculated Doppler velocities with measured Doppler velocities for the plurality of satellites;
find a corrected estimated position of the receiver using the compared Doppler velocities; and
iterate the position estimate by using the corrected estimated position to calculate new Doppler velocities for the plurality of satellites and comparing the calculated new Doppler velocities to the measured Doppler velocities.

11. The GPS receiver of claim 10, wherein the receiver is configured to compare calculated Doppler velocities with measured Doppler velocities by determining a difference vector between the measured Doppler velocity and the calculated Doppler velocity for each of the plurality of satellites.

12. The GPS receiver of claim 11, wherein the receiver is configured to compare calculated Doppler velocities with measured Doppler velocities by selecting the component in the difference vector with the largest absolute value, which corresponds to a first satellite of the plurality of satellites.

13. The GPS receiver of claim 12, wherein the receiver is configured to find a corrected estimated position of the receiver using the compared Doppler velocities by selecting a location by moving backward on a satellite velocity vector of the first satellite when the calculated Doppler velocity is larger than the measured Doppler velocity and by moving forward on a satellite velocity vector of the first satellite when the calculated Doppler velocity is smaller than the measured Doppler velocity and projecting that location onto the Earth to generate the corrected estimated position.

14. The GPS receiver of claim 13, wherein the receiver is configured to halt the iterations when a difference vector between a calculated new Doppler velocity and a measured Doppler velocity falls below a desired threshold.

15. The GPS receiver of claim 14, wherein the desired threshold comprises 5 m/s.

16. The GPS receiver of claim 11, wherein the receiver is configured to compare calculated Doppler velocities with measured Doppler velocities by removing a common error, $err_{COMM}$, from the measured Doppler velocities.

17. The GPS receiver of claim 10, wherein the receiver is configured to find a corrected estimated position by performing a least squares routine that estimates position by minimizing differences between the calculated Doppler velocities and the measured Doppler velocities.

18. The GPS receiver of claim 10, wherein the corrected estimated position of the receiver has an accuracy of better than approximately 60 km

* * * * *

UNITED STATES PATENT AND TRADEMARK OFFICE
CERTIFICATE OF CORRECTION

| | | |
|---|---|---|
| PATENT NO. | : 8,125,378 B1 | Page 1 of 1 |
| APPLICATION NO. | : 12/476383 | |
| DATED | : February 28, 2012 | |
| INVENTOR(S) | : Janne Jarvenpaa | |

It is certified that error appears in the above-identified patent and that said Letters Patent is hereby corrected as shown below:

Title Page, Item (12) "Jarpenvaa" should read --Jarvenpaa--.

Title Page, Item (75) Inventor should read --Janne Jarvenpaa, Tampere (FI)--.

Signed and Sealed this
Seventeenth Day of April, 2012

David J. Kappos
*Director of the United States Patent and Trademark Office*